United States Patent Office 3,829,330
Patented Aug. 13, 1974

3,829,330
HIGH RATE Li/MoO₃ ORGANIC ELECTROLYTE CELL
Arabinda Narayan Dey, Needham, Mass., assignor to P. R. Mallory & Co. Inc., Indianapolis, Ind.
Continuation of application Ser. No. 853,312, Aug. 27, 1969, now Patent No. 3,808,052. This application Aug. 11, 1971, Ser. No. 170,710
Int. Cl. H01m 35/02
U.S. Cl. 136—6 LN                    9 Claims

ABSTRACT OF THE DISCLOSURE

A further improvement in the performance of Li/MoO₃ in terms of the rate capability and the energy density, by the addition of SO₂ in the electrolyte.

---

This is a continuation of my copending Application U.S. Ser. No. 853,312 filed Aug. 27, 1969, now U.S. Pat. No. 3,808,052, said Application is directed to a lithium/MoO₃ organic electrolyte cell exhibiting high voltage output, high energy density and longer shelf life.

The present invention is a further improvement in the performance of the above cell, based upon substantially increased rate capability and energy density. This is done by the addition of SO₂ in the electrolyte, with the SO₂ acting as a co-depolarizer with the MoO₃.

It is an object of the present invention to provide a new and improved electrolyte for use in the lithium/organic electrolyte cell systems, with the organic electrolyte battery having substantially improved performance in terms of its rate capability and energy density.

It is another object of the present invention to provide a new lithium/MoO₃ organic electrolyte cell utilizing a co-depolarizer for obtaining a simultaneous discharge with the MoO₃ to thereby increase the cell capacity and the high energy density of the cell.

It is a further object of the present invention to provide a novel organic electrolyte and cathode combination comprising an organic solvent having SO₂ dissolved therein; a cathode the active material of which comprises MoO₃ immersed in the organic electrolyte, and with the dissolved SO₂ acting as a co-depolarizer with the MoO₃.

It is a still further object of the present invention to provide an organic electrolyte cell comprising a light metal anode such as lithium; a cathode the active material of which comprises MoO₃ and which further contains an electrically conductive carbon particle material; and an organic electrolyte comprising an organic solvent having a conductive salt dissolved therein and having SO₂ dissolved therein, with the dissolved SO₂ acting as a co-depolarizer with the MoO₃.

Other and further objects of the present invention will be apparent from the following description here and after.

Generally speaking, the present invention provides a new battery system in which the problem of low rate capability in an organic electrolyte cell is substantially overcome. This substantial improvement is the direct result of the presence, in the battery, of a novel depolarizer and co-depolarizer combination comprised of a cathode the active material of which comprises MoO₃ being immersed in an organic electrolyte which comprises an organic solvent having SO₂ and a salt dissolved therein. The dissolved SO₂ acts as a co-depolarizer with the MoO₃ and undergoes simultaneous discharge therewith.

The Li/MoO₃ organic electrolyte cell described in the application S.N. 853,312 exhibited high output voltage, high energy density and long shelf life.

It has been discovered that it is possible to achieve substantial improvements in the performance of the above cell in terms of the rate capability and the energy density, by the addition of SO₂ to the electrolyte. In this instance, SO₂ acts as a co-depolarizer with the MoO₃, so that both the MoO₃ and SO₂ are discharged simultaneously giving rise to the increased cell capacity and the high rate capability.

The principle of co-depolarization of an insoluble cathode by a soluble co-depolarizer viz SO₂, that has been discovered here, is novel. The phenomenon relies on the juxtaposition of thermodynamic potentials of the insoluble depolarizer and the soluble co-depolarizer. For example, in this specific case of MoO₃, the thermodynamic potentials of the Li/MoO₃ cell and the Li/SO₂ cell are quite similar and consequently, the discharge of the Li/MoO₃ cell with SO₂ added to the electrolyte, results in the initial reduction of MoO₃ to MoO₂, which is again oxidized by SO₂ to MoO₃ by a chemical reaction such as, $2MoO_2 + SO_2 \rightarrow 2MoO_3 + S$ thereby regenerating or recharging the insoluble depolarizer MoO₃. In this instance, the phenomenon can be viewed upon as "in situ chemical charging" of the cathode or "cathode pumping." This principle is distinctly different from that described by Meyers et al. (U.S. 3,423,242) where SO₂ was used for increasing the conductivity and the decomposition potential of the electrolyte. According to this invention, all insoluble depolarizers, as disclosed by Meyers et al., are not suitable for such cathode pumping. The suitability of a depolarizer for such actions disclosed here, will depend on the thermodynamic potentials of depolarizers. This distinction has not been made by Meyers et al.

The cell described here is also distinctly different from that disclosed by Maricle et al. (U.S. 3,567,515) where SO₂ was used as the sole soluble depolarizer. According to this invention, the capacities of both the insoluble depolarizer, viz MoO₃ and the soluble depolarizer, viz SO₂ are realized due to an effective simultaneous discharge of both, thereby resulting in an improvement in the cell performance over those disclosed by Meyers et al. and Maricle et al.

Figure 1:
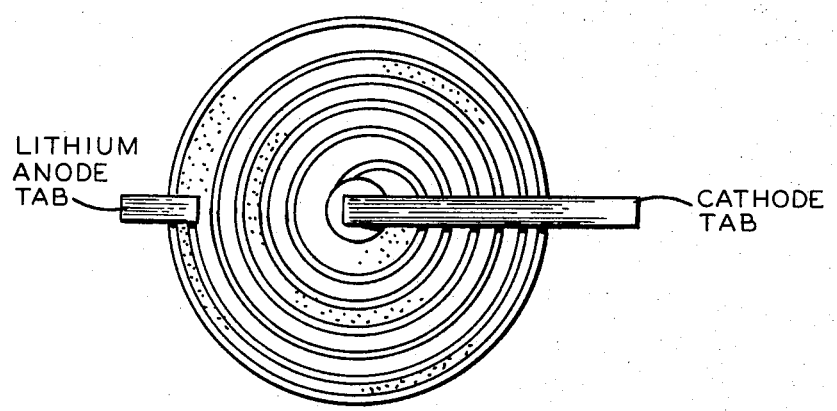
FIG. 1 is a drawing of the anode cathode subassembly wound into a cylindrical roll.
Figure 2:
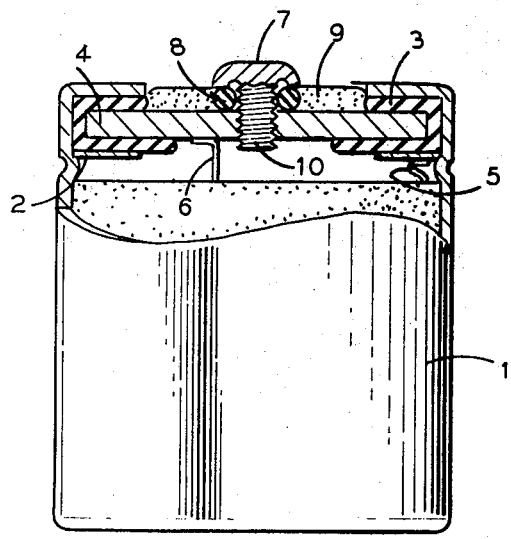
FIG. 2 is a cross-section of the top portion of an assembled cell structure of the present invention.

The Li/MoO₃ cell was constructed in a cylindrical configuration by winding a 1.75" x 13.25" strip of flexible MoO₃ cathode, a 1.65" x 14" strip of lithium anode and two 2.0" x 14" strips of 0.0005" thick nonwoven polypropylene fabric separators into a cylindrical roll, as shown in FIG. 1. The roll was then packaged in a "D" size cylindrical steel can as shown in FIG. 2. The lithium anode tab (5) from the roll was spot welded to the metal ring support (2) which was in contact with the wall of the can and the cathode tab (6) from the roll was spot welded to the aluminum top (4). The aluminum top had a threaded hole (10) which was used as electrolyte fill port. The top was crimp sealed using EPR or butyl rubber gasket (3). The cell was chilled in Dry Ice before adding chilled electrolyte consisting of a mixture of one part by volume of 1.75 (M) LiBr in a mixture of acetonitrile (AN) and propylene carbonate (10:3 volume ratio), saturated with SO₂ (approximately 7.5 (M)), and one part by a volume of liquid SO₂. Approximately 20 cc. of the above electrolyte was added through the electrolyte fill port. The electrolyte fill port was sealed with a bolt (7) fitted with a butyl rubber gasket (8) and the cell top was covered with epoxy in order to prevent any mechanical loosening of the fill port bolt. The round head of the bolt protruded out of the epoxy layer (9) and served as a positive terminal of the cell. The cell can served as the negative terminal.

The MoO$_3$ cathode was made by pasting a premixed dough type mixture of MoO$_3$, carbon, asbestos fiber and colloidal Teflon onto the expanded aluminum current collector, curing it at elevated temperatures and then cutting it to proper size (1.75" x 13.25"). The thickness of the cathode was approximately 0.040" and the weight of the mix was approximately 9 grams. The aluminum collector located at the one end of the cathode.

The lithium anode was made by pressing a 0.020" thick lithium ribbon onto the expanded stainless steel current collector. Nickel tabs were spot welded to one end of the anode.

Discs of separator material were used at the bottom and at the top of the electrode roll inside the can in order to provide electrical insulation.

Figure 3:
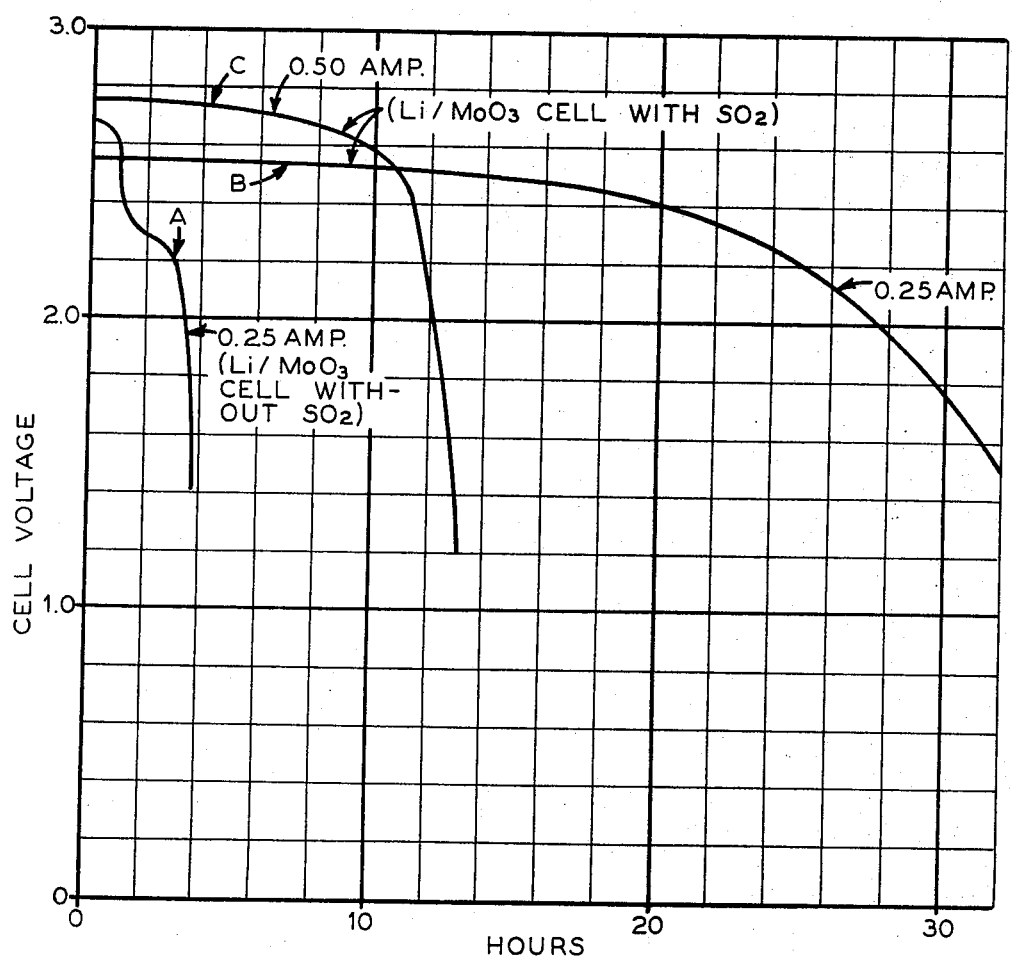
FIG. 3 is a voltage time curve for test cells with and without SO₂ in the electrolyte.

The cells made in the above manner were discharged at 0.250 amp and 0.50 amp constant drain. The voltage time curves are shown in FIG. 3 curve B and C. The capacity recovered above the 2.0 volt cutoff, was 7 a.hr. at 0.25 amp, and 6 a.hr. at 0.50 amp.

The Li/MoO$_3$ cell was also made in the similar manner except no SO$_2$ was added in the electrolyte, and it was discharged at 0.25 amp drain. The discharge curve is shown in FIG. 3 curve A. The capacity recovered up to the 2.0 volt cutoff was only 0.85, a.hr. compared to 7 a.hr. obtained in the cells which contained SO$_2$ in the electrolyte. Thus an eight fold improvement in the cell performance has been achieved.

The improvement of the rate capability of the Li/MoO$_3$ cell, with the addition of SO$_2$ in the electrolyte is particularly impressive. For example, the capacity recovered at twice the current i.e. 0.5 amp was 6 a.hr.; which was approximately seven times greater than the capacity recovered at half the current (0.25 amp) with the Li/MoO$_3$ cell without SO$_2$.

The scope of the invention and the improvements referred to are applicable to all Li/MoO$_3$ organic electrolyte cells with (a) Solvents such as tetrahydrofuran, propylene carbonate, dimethyl sulfite, N-nitrosodimethyl amine, gamma-butyrolactone, N:N dimethyl formamide, dimethyl sulfoxide, dimethyl carbonate, methyl formate, butyl formate and acetonitrile and the mixtures thereof.

(b) And electrolyte salts such as lithium halides, perchlorate, hexafluorophosphate, tetrafluoroborate, hexafluoroarsenate and tetrachloroaluminate.

Although the present invention has been disclosed in connection with a few preferred embodiments thereof, variations and modifications may be resorted to by those skilled in the art without departing from the principles of the new invention. All of these variations and modifications are considered to be within the true spirit and scope of the present invention as disclosed in the foregoing description and defined by the appended claims.

What is claimed is:

1. An organic electrolyte cell comprising an anode; a cathode the active material of which comprises MoO$_3$; and an organic electrolyte comprising an organic solvent having SO$_2$ dissolved therein, said dissolved SO$_2$ acting as a co-depolarizer with the MoO$_3$, and said organic electrolyte having a conductive lithium salt dissolved therein.

2. The organic electrolyte cell of claim 1 wherein the anode is a light metal such as lithium.

3. The organic electrolyte cell of claim 2 wherein the cathode further comprises an electrically conductive carbon particle material.

4. The organic electrolyte cell of claim 3 wherein the organic solvent is selected from the group consisting of tetrahydrofuran, propylene carbonate, dimethyl sulfite, N-nitrosodimethyl amine, gamma-butyrolactone, N:N dimethyl formamide, dimethyl sulfoxide, dimethyl carbonate, methyl formate, butyl formate, acetonitrile, and mixtures thereof.

5. The organic electrolyte cell of claim 4 wherein the organic electrolyte further comprises a dissolved conductive lithium salt selected from the group consisting of halides, perchlorates, hexafluorophosphates, tetrafluoroborates, hexafluoroarsenates, and tetrachloroaluminates.

6. An organic electrolyte in combination with a cathode for use in an organic electrolyte cell comprising an organic solvent having SO$_2$ and a conductive lithium salt dissolved therein; a cathode the active material of which comprises MoO$_3$ being immersed in said organic electrolyte; said dissolved SO$_2$ acting as a co-depolarizer with the MoO$_3$.

7. The organic electrolyte cathode combination of claim 6 wherein the cathode further comprises an electrically conductive carbon particle material.

8. The organic electrolyte cathode combination of claim 7 wherein the organic solvent is selected from the group consisting of tetrahydrofuran, propylene carbonate, dimethyl sulfite, N-nitrosodimethyl amine, gamma-butyrolactone, N:N dimethyl formamide, dimethyl sulfoxide, dimethyl carbonate, methyl formate, butyl formate, acetonitrile, and the mixtures thereof.

9. The organic electrolyte cathode combination of claim 8 wherein the salt is a lithium salt selected from the group consisting of halides, perchlorates, hexafluorophosphates, tetrafluoroborates, hexafluoroarsenates, and tetrachloroaluminates.

References Cited

UNITED STATES PATENTS

| Patent | Date | Inventor | Class |
|---|---|---|---|
| 3,644,145 | 2/1972 | Fraioli et al. | 136—6 |
| 3,380,855 | 4/1968 | Mahy et al. | 136—100 R |
| 3,413,154 | 11/1968 | Rao | 136—100 R |
| 3,423,242 | 1/1969 | Meyers et al. | 136—6 |
| 3,567,515 | 3/1971 | Maricle et al. | 136—6 |
| 3,414,438 | 12/1968 | Lindholm et al. | 136—86 D |
| 3,480,479 | 11/1969 | Nestor | 136—86 D |
| 3,492,164 | 1/1970 | Wolfe, Jr. | 136—86 D |
| 3,505,118 | 4/1970 | Mehra et al. | 136—86 D |
| 3,493,433 | 2/1970 | Hoffmann | 136—28 |
| 3,578,500 | 5/1971 | Maricle et al. | 136—6 |
| 3,043,896 | 7/1962 | Herbert et al. | 136—6 LN |

WINSTON A. DOUGLAS, Primary Examiner

C. F. LeFEVOUR, Assistant Examiner

U.S. Cl. X.R.

136—20